Patented July 21, 1942

2,290,600

UNITED STATES PATENT OFFICE 2,290,600

VINYL ALCOHOL-ACRYLIC OR METHACRYLIC ESTER COPOLYMERS

Harry T. Neher and La Verne N. Bauer, Bristol, Pa., assignors to Röhm & Haas Company, Philadelphia, Pa.

No Drawing. Application June 13, 1939, Serial No. 278,899

4 Claims. (Cl. 260—84)

This invention relates to preparation of copolymers of vinyl alcohol and acrylic or α-methacrylic esters and to the products thereby obtained.

It is known that polymerized vinyl esters such as polyvinyl acetate can be hydrolyzed to polyvinyl alcohol and that polyacrylic esters can be hydrolyzed to polyacrylic acid. Both of these hydrolyses may be carried to completion or stopped at an intermediate point whereby products are obtained which in the first case are copolymers of vinyl alcohol and vinyl esters, and in the second, copolymers of acrylic acid and the esters of acrylic acid. It has also been proposed to saponify copolymers of vinyl esters and acrylic esters so that the acid radical of the vinyl ester and the alcohol radical of the acrylic ester are split off leaving a copolymer of vinyl alcohol and acrylic acid, and then subjecting this product to conditions under which lactone formation occurs.

It has now been found that new and useful polymers may be prepared from copolymers of vinyl esters with acrylic or methacrylic esters, by converting the vinyl ester part of the copolymer into vinyl alcohol units under conditions whereby the acrylic or methacrylic part is not converted into acrylic or methacrylic acid units. It has also been found that these conditions can be fulfilled by effecting an alcoholysis of the polymer in the presence of an alcohol which may or may not correspond to the alcohol radical present in the acrylic or methacrylic ester part of the copolymer. For example, an ethyl acrylate and vinyl acetate copolymer subjected to alcoholysis in an ethyl alcohol solution, gives a copolymer of ethyl acrylate and vinyl alcohol, or a copolymer of ethyl acrylate, vinyl alcohol, and vinyl acetate, depending on the extent of the alcoholysis reaction. The other product of the reaction is ethyl acetate. When, as in this illustration, the alcohol used in the alcoholysis is the same as the alcohol radical present in the acrylic ester, the vinyl acetate units are converted into vinyl alcohol units but the ethyl acrylate units remain unchanged. If the alcohol present during the alcoholysis does not correspond to the alcohol radical present in the acrylic or methacrylic ester units in the copolymer, then at least a part of these ester units may be converted into an ester of the alcohol used in the solvent. If, in the above example, 2-ethyl hexyl alcohol is used in place of the ethyl alcohol, the ethyl acrylate units in the polymer may be converted, at least in part, into 2-ethyl hexyl acrylate units.

If the copolymer is soluble in the alcohol with which it is to be reacted, it is generally preferable to use this alcohol as the sole solvent. In the case of copolymers not readily soluble in the alcohol, the solubility can be increased by adding inert solvents, such as benzene, toluene, dioxane, or even ketones. Esters corresponding to the alcohol may also be added; e. g. methyl acetate to methanol, ethyl acetate to ethanol, etc.

As suitable catalysts for the alcoholysis, one may use acids such as sulfuric, hydrochloric, phosphoric, p-toluene sulfonic, or alkaline substances such as sodium alkoxide or potassium hydroxide. It has been found that the sodium alkoxides are especially effective catalysts; often less than 1%, calculated on the weight of polymer, being sufficient. With these as catalysts, the reactions have often been substantially complete after one hour at room temperature, and occasionally after fifteen minutes. With acid catalysts it is usually necessary to heat the reaction mixtures for some time to effect appreciable reaction. In the case of acid catalysts, a larger amount is generally required than with sodium alkoxides. Usually 3–15%, based on the weight of the polymer, has been sufficient. In every case the reaction should be carried out under substantially anhydrous conditions, since otherwise, the alcoholysis may be accompanied by a certain amount of hydrolysis in which case the action would not necessarily be confined to the vinyl ester.

By varying the ratio and kind of esters used in preparing the copolymers, it is possible to prepare suitable polymers of widely varying properties. Suitable vinyl esters include vinyl acetate, vinyl chloroacetate, vinyl butyrate, vinyl isobutyrate and vinyl stearate. Suitable acrylic and methacrylic esters include the methyl, ethyl, n-propyl, n-butyl, isobutyl, sec.-butyl, n-amyl, isoamyl, n-hexyl, 2-ethyl butyl, 2-ethyl hexyl, lauryl, cetyl, octadecyl, β-chloroethyl, β-ethoxyethyl, cyclohexyl, and benzyl esters.

Since the acid group is removed from the vinyl ester during the alcoholysis of the copolymers, it is generally preferable to use the simplest and most readily available vinyl ester; i. e. vinyl acetate. However, in cases where the alcoholysis of the vinyl ester is not carried to completion, it may be desirable for certain purposes to use a different vinyl ester in preparing the copolymer; e. g. vinyl butyrate or vinyl stearate. In such cases, the influence of the unconverted vinyl ester on the properties of the final polymer is roughly proportional to amount present. The influence of the vinyl alcohol in the alcoholyzed polymers is generally to toughen and harden them. As the ratio of vinyl alcohol increases, the polymers generally become less soluble in organic solvents, and their tendency to absorb water increases. Polymers containing as little as 3% by weight of vinyl alcohol units are substantially tougher than the untreated copolymer or the corresponding 100% acrylic or methacrylic ester polymer. Preferably the total number of vinyl alcohol units in the polymer is kept below 50% and for most purposes within the range of from 20% to 2%.

The properties of the alcoholyzed copolymers are also influenced by the kind of acrylic or methacrylic ester present. The lower methacrylic esters, especially methyl and ethyl, give hard, tough polymers. Those of the higher methacrylates become increasingly softer, the extent of the softening influence depending upon the amount as well as the kind of ester present. The polymers containing the acrylic esters are definitely softer and more flexible than those containing the corresponding methacrylic esters. A balance of properties may be obtained by using a mixture of acrylic and methacrylic esters, as, for instance, by using as the starting material a copolymer of a vinyl ester, methyl acrylate and methyl methacrylate. To a limited extent, the properties of the polymers are also influenced by their molecular weight, as measured by viscosity.

In the preparation of the copolymer of vinyl ester and acrylic or methacrylic ester it is desirable to remove as far as possible any unpolymerized vinyl ester. Otherwise, colored bodies may be formed due to the decomposition of the unpolymerized vinyl ester during the alcoholysis step. A convenient method of providing for the easy removal of unpolymerized vinyl ester is to copolymerize the vinyl ester and acrylic or methacrylic ester in a water miscible organic solvent such as alcohols and ketones. The polymer may then be recovered substantially free from monomers and in a convenient form for handling by agitating the polymerization solution and slowly adding water. The viscosity of the mixture gradually increases until finally the dough-like mass obtained "breaks" whereupon the polymer separates from the solvent in the form of fine granules. The "break" generally occurs before the amount of water added exceeds 25% of the amount of solvent present. The monomers remain in the solvent from which the polymer is readily removed as by centrifuging or filtering. By washing and air drying the last traces of monomer may be removed from the polymer but usually this is not necessary. The polymer may then be dissolved in a solvent containing alcohol and subjected to an alcoholysis as above described.

*Example 1.*—A copolymer of methyl acrylate and vinyl acetate was prepared by refluxing for 24 hours a mixture of 270 parts methyl acrylate, 30 parts vinyl acetate, 300 parts ethylene dichloride, and 0.3 part benzoyl peroxide. Volatile matter was then removed by prolonged distillation under reduced pressure. The residual polymer (298 parts) represented a 99% yield. The polymer was a soft, elastic mass, soluble in acetone, benzene, ethyl acetate, and ethylene dichloride.

To a solution of 138 parts of this polymer in 288 parts dry acetone was added 0.5 part sodium methoxide in 138 parts dry methanol. After 5 hours at 25° C., the solution was poured into several times its volume of water containing a little acetic acid. The polymer was obtained in the form of fine shreds. These were washed thoroughly with water, then dried for 24 hours in vacuum at 85° C. The dried polymer (121 parts) swelled in acetone, but did not dissolve. It was soluble in a mixture of acetone and cellosolve or in ethylene dichloride and tert. butanol. Clear, colorless films were obtained from these solutions. They were somewhat harder and distinctly tougher than films from the untreated polymer. Whereas the untreated polymer showed poor adhesion to glass, these films showed excellent adhesion.

*Example 2.*—A copolymer was prepared from equal parts of methyl acrylate and vinyl acetate, according to the procedure described in Example 1. The yield was 76% of a rather soft, colorless solid.

To a solution of 80 parts of this dried polymer in 450 parts dry benzene was added 1.4 parts sodium methoxide in 90 parts methanol. Within ten minutes after mixing, the solution set to gel. After 16 hours, 8 parts of acetic acid was worked into the gel and the solvents then removed by steam distillation. After thorough washing and drying, the residual polymer amounted to 62 parts by weight. It was a very tough, hard, colorless solid, insoluble in, but swelled by acetone, ethylene dichloride, benzene, isopropanol and dioxane.

*Example 3.*—Eighty parts of a copolymer prepared by polymerizing equal weights of ethyl acrylate and vinyl acetate in benzene was dissolved in 450 parts dry benzene. Within 5 minutes after the addition of 1.8 parts sodium ethoxide in 160 parts anhydrous ethanol, the solution started to gel. After 18 hours, the gel was worked up as described in Example 2. The polymer (72 parts) was very tough, hard, and nearly colorless. It was swelled by, but did not dissolve in ethylene dichloride, dioxane, benzene, acetone or 95% ethanol. However, it dissolved readily in benzene or dioxane containing a little n-butyraldehyde and hydrogen chloride.

*Example 4.*—Two hundred parts of a copolymer prepared from 80 parts methyl acrylate and 20 parts vinyl acetate was dissolved in 400 parts benzene. To this was added a solution of 27 parts hydrogen chloride in 587 parts dry methanol. Soon after mixing the solutions, polymer began to precipitate. After 4 days at room temperature, the mixture was made alkaline with a solution of ammonia in methanol. The bulk of the liquid was separated from the polymer by decantation, the remainder by steam distillation. The polymer remained as a rather hard, tough, colorless mass (185 parts).

*Example 5.*—A copolymer prepared from 70 parts methyl acrylate and 30 parts vinyl acetate was treated as described in Example 4, except that the methanol solution contained 12 parts sulfuric acid instead of the hydrogen chloride. The resulting polymer (183 parts) was a tough, rather hard mass, which was insoluble in, but swelled by ethanol. It was soluble in a mixture of ethylene dichloride and tertiary butanol (2:1).

*Example 6.*—A solution of 230 g. vinyl acetate, 530 g. ethyl methacrylate, 0.75 g. benzoyl peroxide, and 0.75 g. acetic anhydride in 600 g. tertiary butanol and 150 g. cellosolve, was heated to reflux on a water bath. After 6 hours, 0.3 g. benzoyl peroxide was added and the heating continued for 40 hours. The clear, colorless, highly viscous solution was diluted with 750 g. acetone, after which cold water was slowly added, with vigorous stirring. The mixture became turbid and gradually increased in viscosity until it reached a soft, dough-like stage. Upon the addition of more water, this mass broke and the polymer separated as fine white granules. They were separated by filtration from the solvent mixture containing any unpolymerized monomer, washed with cold water, and dried. Weight 642 g. Analysis of the dried polymer for acetyl groups by the Phillips method (Anal. Ed. Ind. Eng. Chem., 6, 321 (1934); Ralph L. Shriner: Quantitative Analysis of Organic Compounds, pub. by Edwards Bros., Inc., Ann Arbor, Michigan, 1938, pp. 37-8) gave a value of 9.4%, which corresponds to a vinyl acetate content of 13.7%.

Two hundred grams of the dried polymer was dissolved in 400 g. cellosolve. A solution of 3 g. sodium ethanoxide in 100 g. anhydrous ethanol was stirred in and the mixture heated 115–120° for 16 hours. During this time 55.6 grams of a colorless distillate was collected which, upon analysis, was shown to contain 10.3 g. of ester, calculated as ethyl acetate. From the reaction mixture, there was isolated 173 g. of dry polymer. This polymer was distinctly harder and tougher than the untreated polymer. Its adhesion to glass and metals was highly superior to that of the original polymer.

*Example 7.*—Forty parts of a copolymer prepared from 80 parts ethyl methacrylate and 20 parts vinyl acetate was dissolved in 225 parts dry benzene. A solution of 2.5 parts sodium ethoxide in 80 parts absolute ethanol was added and the mixture allowed to stand for 16 hours at room temperature, during which time the viscosity increased greatly. Five parts acetic acid was then added and the solvents separated from the polymer by steam distillation. The dried polymer (39 parts) was harder and tougher than the untreated polymer. It dissolved in ethylene dichloride to give solutions of very high viscosity. Films prepared on glass from these solutions showed excellent adhesion. Films containing 25–30% dibutyl sebacate as plasticizer showed excellent resistance to impact over a wide temperature range. The treated polymer was definitely superior to the untreated polymer, in both its adhesion and impact resistance.

*Example 8.*—Forty parts of the same copolymer used in Example 7 was dissolved in 225 parts dry benzene and then mixed with a solution 1 part sodium dissolved in 40 parts 2-ethyl hexyl alcohol. Within 5 minutes after mixing, the solution had set to a gel. After 24 hours, 5 parts acetic acid was added and the mixture steam distilled. The dried polymer, amounting to 41.2 parts, was very tough and definitely softer than the untreated polymer. The increase in weight, toughness and softness of the treated polymer over the untreated part all indicate that the conversion of the vinyl acetate in the copolymer to vinyl alcohol was accompanied by a conversion of some of the ethyl methacrylate into 2-ethyl hexyl methacrylate.

*Example 9.*—Eighty parts methyl methacrylate and 20 parts vinyl acetate were copolymerized according to the procedure described in Example 1. To a solution of 345 parts of the dried polymer in 804 parts acetone was added a solution of 1 part sodium in 345 parts anhydrous methanol. After 5½ hours, the solution was poured into water containing a little acetic acid. The polymer separated as fine shreds which were washed thoroughly and dried. The dried polymer was soluble in ethylene dichloride, methyl ethyl ketone and ethyl acetate. It was insoluble in tertiary butanol. Films of the polymer made from these solutions were clear, colorless, and hard. When plasticized with 40–45% dibutyl phthalate or dibutyl sebacate, they are clear, tough and quite flexible. Whereas the untreated polymer shows very poor adhesion to glass, the adhesion of the treated polymer is excellent.

*Example 10.*—Ninety parts of a copolymer prepared from 75 parts butyl methacrylate and 25 parts vinyl acetate was dissolved in 213 parts dry acetone and then mixed with a solution of 1.4 parts sodium butoxide in 47 parts dry n-butanol. After 4 hours, the mixture was poured into water containing a little acetic acid. The precipitated polymer was washed thoroughly and dried. The dried polymer (80.5 parts) was soluble in acetone or ethylene dichloride. Films of this polymer were clear, colorless and definitely harder and tougher than films from the untreated polymer.

As indicated in these examples the toughness of the new interpolymers and their adhesivness toward glass make them valuable as the strengthening layer of a shatterproof glass. For this purpose they may either be milled into sheets and the sheets inserted between sheets of glass or they may be applied to sheets of glass in solution, the coating thereby obtained dried, and a second sheet of glass, which may or may not also be coated, pressed against the dried film.

The new interpolymers may also be used in coating compositions such as paints, lacquers and enamels, and as textile and leather finishing agents. For the latter purposes they may either be applied in solution or in aqueous emulsion. They may likewise be used in printer's inks and in other applications where a resinous binder for pigment is desired.

The harder copolymers such as those made with methyl and ethyl methacrylate, find use in preparation of molded articles such as phonograph records, dentures, fancy containers of various kinds, umbrella handles, mirror and brush backs and handles, combs, etc. For these purposes they may be used alone or mixed with fillers, pigments or other coloring material or with other plastic compositions such as cellulose derivatives and synthetic resins of the phenol formaldehyde, urea formaldehyde, or polybasic organic acid-polyhydric alcohol type. For the preparation of such articles the copolymers may be prepared either in the form of molding powders or as sheets.

Wide variations in the copolymers are possible by the selection of particular acrylic or methacrylic esters or mixtures thereof and the degree of alcoholysis, but still further variations may be made by the addition of plasticizers or chemically reacting the copolymer with compounds known to react with alcohol groups. Thus the polyvinyl alcohol units of the copolymers may be condensed with various aldehydes such as formaldehyde and butyraldehyde, thereby forming acetal units. Or the polyvinyl alcohol units may be condensed with polybasic organic acids such as phthalic, sebacic and maleic acids, or with mixtures of these acids and monobasic acids such as the higher fatty acids and acid reacting natural resins such as rosin. Similarly, valuable products are obtained by reacting urea and formaldehyde in the absence of substantial amounts of water but in the presence of the new copolymers. There is thereby obtained a unitary reaction product that is not the same as the mixture of urea formaldehyde resin and copolymer.

We claim:

1. A copolymer of vinyl alcohol and a methacrylic acid ester of a monohydric aliphatic primary alcohol having one to four carbon atoms in the alcohol radical, the amount of vinyl alcohol in the copolymer being about 2% to about 20% of the total weight of the copolymer.

2. A copolymer of methyl methacrylic with about 2% to about 20% by weight of vinyl alcohol.

3. A copolymer of ethyl methacrylate with about 2% to about 20% by weight of vinyl alcohol.

4. A copolymer of butyl methacrylate with about 2% to about 20% by weight of vinyl alcohol.

HARRY T. NEHER.
LA VERNE N. BAUER.